United States Patent
Häberlein et al.

[11] Patent Number: 5,842,277
[45] Date of Patent: Dec. 1, 1998

[54] HAND-HELD WORKING TOOL, ESPECIALLY TRIMMER

[75] Inventors: Jürgen Häberlein, Murrhardt; Helmut Schlessmann, Waiblingen; Klaus-Martin Uhl, Baltmannsweiler, all of Germany

[73] Assignee: Andreas Stihl AG & Co., Waiblingen, Germany

[21] Appl. No.: 630,936

[22] Filed: Apr. 5, 1996

[30] Foreign Application Priority Data

Apr. 6, 1995 [DE] Germany ............ 195 12 833.8

[51] Int. Cl.$^6$ .................................................. B26B 7/00
[52] U.S. Cl. ................... 30/276; 30/381; 173/171
[58] Field of Search ................. 173/170, 171; 30/276, 381; 123/400

[56] References Cited

U.S. PATENT DOCUMENTS

| | | | |
|---|---|---|---|
| 3,845,847 | 11/1974 | Camp | 123/198 DC |
| 3,903,679 | 9/1975 | Sorenson et al. | 74/523 X |
| 4,066,154 | 1/1978 | Ross | 74/489 X |
| 4,438,658 | 3/1984 | Carlson | 74/523 X |
| 4,570,593 | 2/1986 | Take et al. | 123/398 |
| 4,696,108 | 9/1987 | Zerrer et al. | 30/276 |
| 4,761,939 | 8/1988 | Zerrer | 30/276 X |
| 4,773,371 | 9/1988 | Stenz | 123/400 X |
| 4,798,185 | 1/1989 | Driggers | 123/400 |
| 5,035,055 | 7/1991 | McCullough | 30/276 |
| 5,042,626 | 8/1991 | Dohse et al. | 30/381 X |
| 5,076,411 | 12/1991 | Kramer et al. | 30/381 X |
| 5,152,268 | 10/1992 | Hendron et al. | 123/400 |
| 5,216,992 | 6/1993 | Ropertz et al. | 123/400 |
| 5,447,206 | 9/1995 | Coleman et al. | 173/170 |

FOREIGN PATENT DOCUMENTS 3421999   1/1986   Germany .

*Primary Examiner*—M. Rachuba
*Attorney, Agent, or Firm*—Robert W. Becker & Associates

[57] ABSTRACT

A hand-held working tool has a drive motor and a grip connected at a distance to the drive motor. Operating elements, including a throttle lever, a choke actuator, and a short-circuiting switch, are connected to the grip for controlling the drive motor. A transmission device, including a Bowden cable arrangement with a sleeve and a cable enclosed by the sleeve, is provided for connecting the operating elements to the drive motor. The transmission device has an inner tube inserted into the Bowden cable arrangement wherein the inner tube is positioned between the sleeve and the cable so as to be longitudinally displaceable relative to the sleeve and the cable.

19 Claims, 9 Drawing Sheets

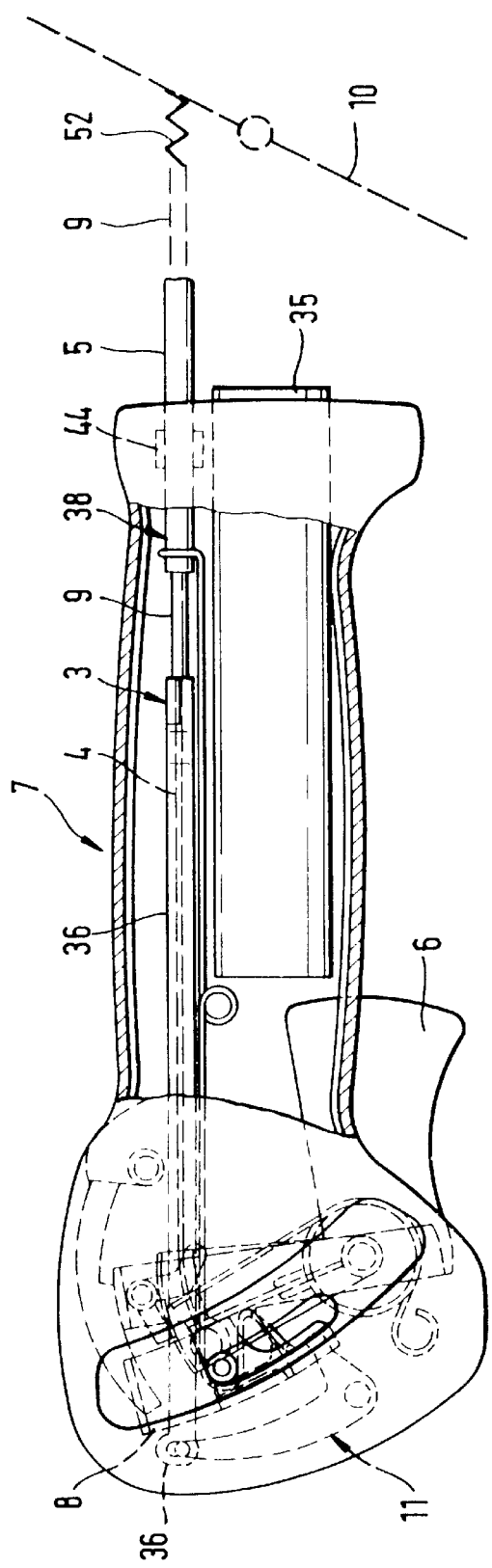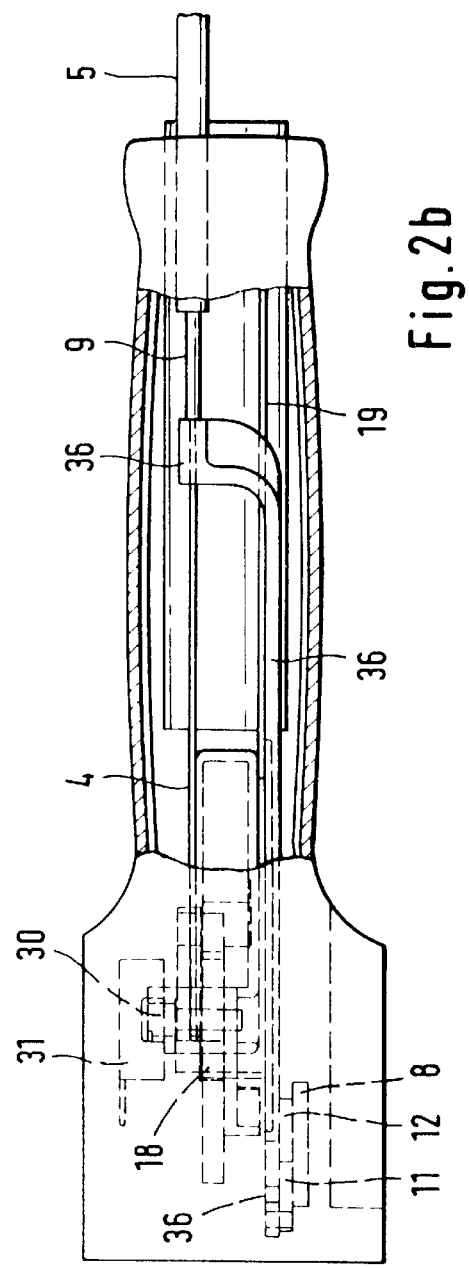

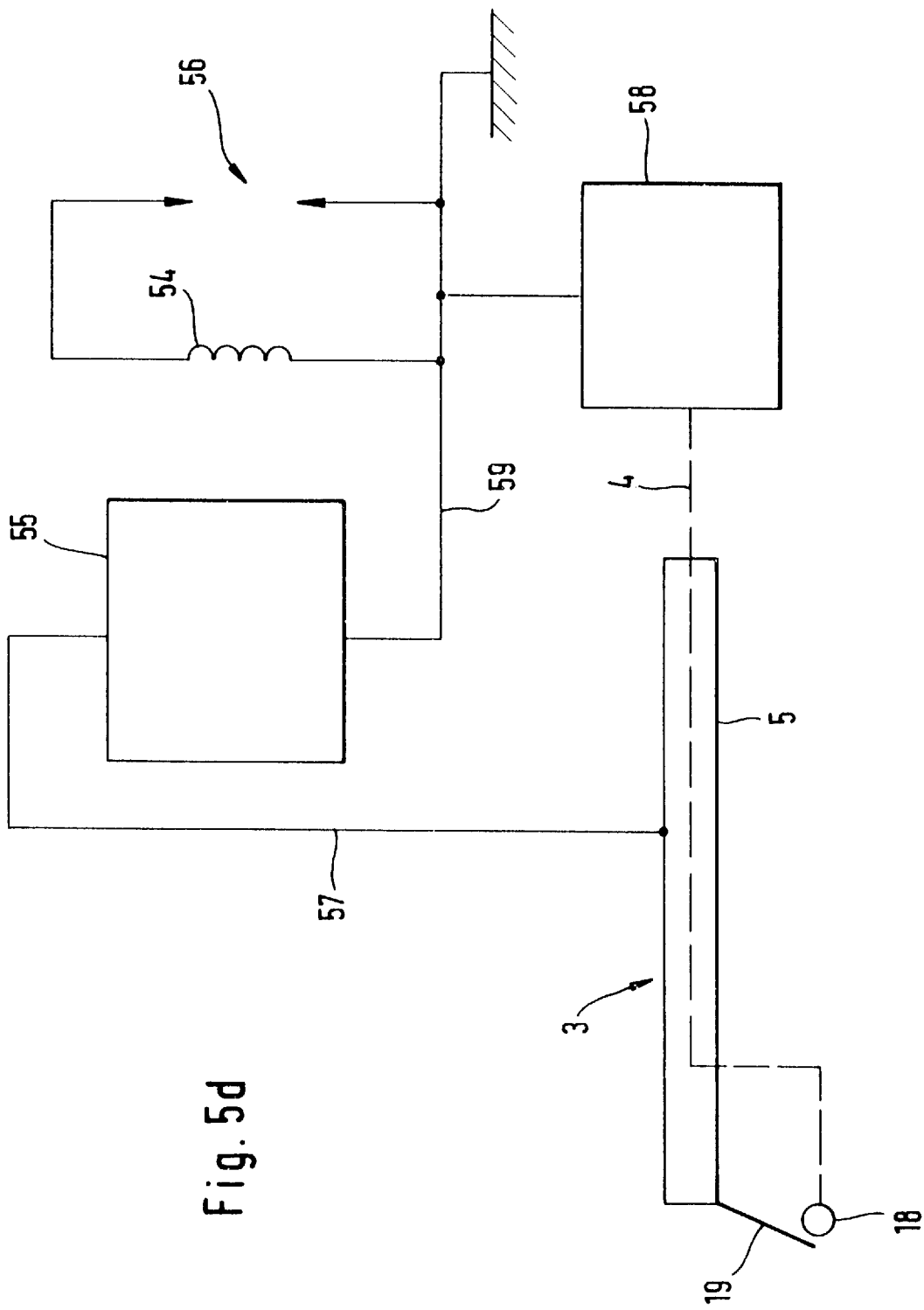

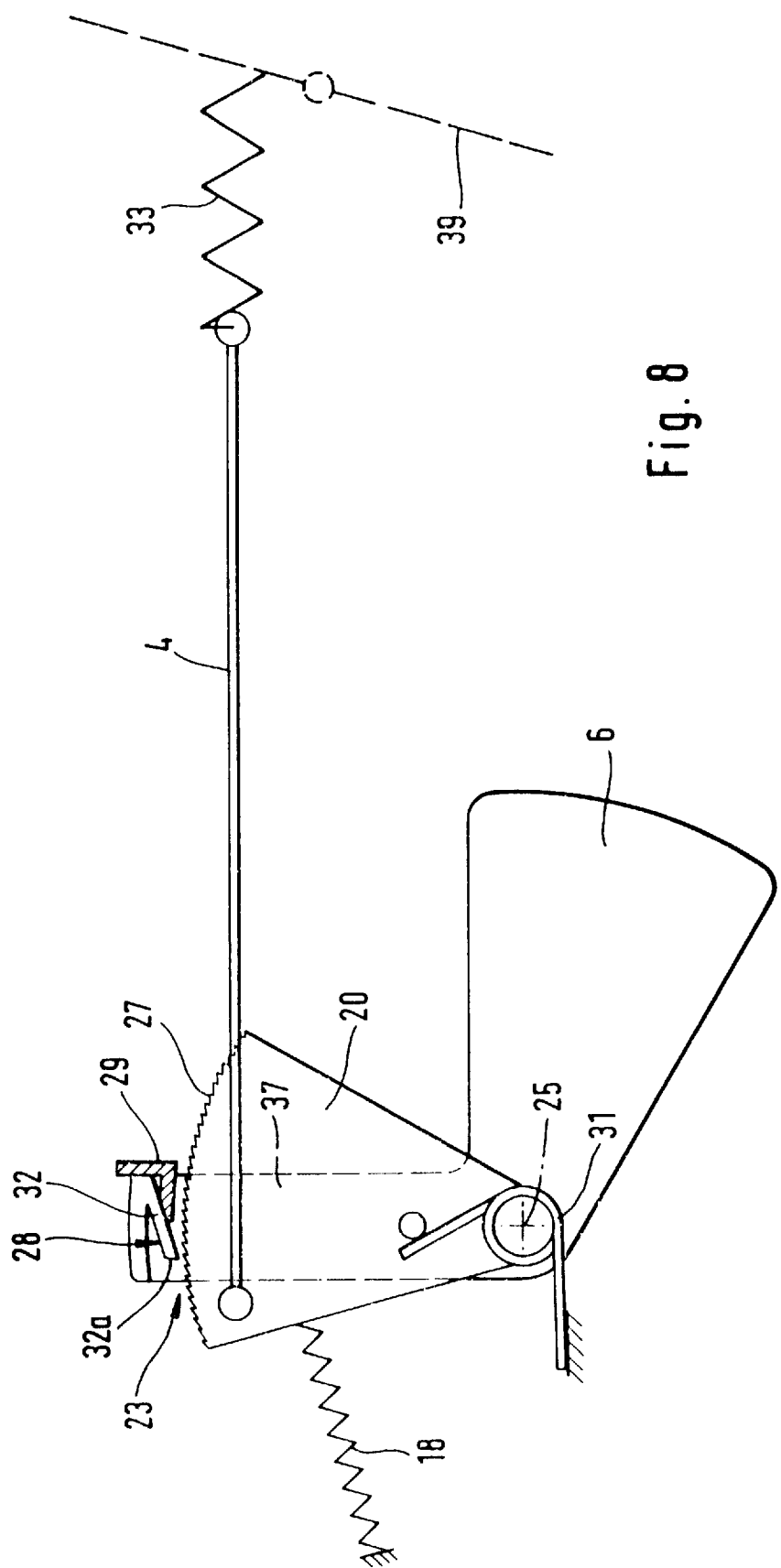

HAND-HELD WORKING TOOL, ESPECIALLY TRIMMER

BACKGROUND OF THE INVENTION

The present invention relates to a hand-held working tool, especially a trimmer, with a drive motor and a grip positioned opposite the drive motor whereby at the grip operating elements such as the throttle lever, choke, and a short-circuiting switch are arranged. The operating elements comprise transmission means including a Bowden cable arrangement for connecting the operating means to the drive motor.

From German Offenlegungsschrift 34 21 999 such a working tool is known which is used for cutting grape vines and which comprises a cutting tool driven by a drive motor. The trimmer is to be held and guided with a grip connected to a grip tube whereby the grip comprises a plurality of operating elements such as a choke, a throttle lever, and a short-circuiting switch. The throttle lever and the choke serve respectively to control the combustion engine and as a cold start aid. The short-circuiting switch is connected conventionally with a two-lead short-circuiting cable to the ignition circuit of the drive motor. By short-circuiting the ignition circuit, no ignition energy can be provided by the magnet coil for generating the ignition sparks so that the motor is turned off.

For each of the individual operating elements, an individual transmitting means such as a Bowden cable arrangement or a short-circuiting cable is provided that transmit the control movements initiated by the operator onto the drive motor. Between drive motor and grip a plurality of cables and lines are thus arranged so that there is a risk that one of the transmission means is caught during trimming operations at a branch or shrub etc. This may endanger the operator and damage the working tool.

The operator carries the drive motor on his back. A flexible tube connects the drive motor with the grip tube which during cutting operations is permanently moved back and forth. The grip tube is thus moved relative to the drive motor whereby the transmission means are entrained along the flexible tube during these movements. Due to the continuously occurring relative movements of grip tube and cutting tool, there is a risk that especially the short-circuiting cable breaks as a result of ageing and becomes inoperative.

It is therefore an object of the present invention to provide a hand-held working tool in which the number of transmission means between grip and drive motor of the working tool is reduced.

SUMMARY OF THE INVENTION

A hand-held working tool according to the present invention is primarily characterized by:

a drive motor;

a grip connected to the drive motor so as to be spaced therefrom;

operating elements including a throttle lever, a choke actuator, and a short-circuiting switch, connected to the grip for controlling the drive motor;

a transmission device, comprising a Bowden cable arrangement with a sleeve and a cable enclosed by the sleeve, connecting the operating elements to the drive motor;

the transmission device comprising an inner tube inserted into the Bowden cable arrangement, wherein the inner tube is positioned between the sleeve and the cable so as to be longitudinally displaceable relative to the sleeve and the cable.

Advantageously, the cable and the sleeve are electrical leads that are installed relative to one another.

Preferably, the choke actuator and the short-circuiting switch are combined in a select switch having a plurality of operational positions, wherein the operational transitions include a short-circuiting position in which an ignition circuit of the drive motor is short-circuited by the sleeve and the cable.

Expediently, the inner tube has a first end that is coupled to the select switch. The select switch comprises an integral follower. The transmission device comprises a pivotable transmission lever with a first arm and a second arm. The first arm pivotably connected to the first end of the inner tube. The arm is displaceable by the integral follower. The operational positions include a choke position, and the transmission lever is locked at the integral follower in the choke position of the select switch.

Preferably, the working tool further comprises a play compensation spring connected to the grip. The play compensation spring is comprised of an electrically conducting material. The play compensation spring has a first end connected to the cable for tensioning the cable. Preferably, the operational positions of the select switch include a start position for starting the drive motor and an operating position for operating the working tool. The working tool preferably further comprises a start position return spring comprised of electrically conducting material and biasing the select switch into the operating position. The start position return spring has a first end and a second end. The first end is connected to the sleeve and the second end contacts the play compensation spring in the short-circuiting position of the select switch.

Expediently, the working tool further comprises a control lever pivotably connected to the grip. The cable has a first end and a second end and the first end is connected to the control lever. The throttle lever has an operative position and an idle position. The control lever in the operative position of the throttle lever is coupled to the throttle lever and in the idle position is disengaged from the throttle lever. The control lever has an arc-shaped portion with a catch means. The throttle lever has a catch member. The catch member engages the catch means in the operative position for coupling the throttle lever to the control lever. The grip also has an abutment at which the catch member rests when the control lever is disengaged from the throttle lever.

In yet another embodiment of the present invention the catch member is a two-arm lever pivotably connected to the throttle lever. A first arm of the two-arm lever rests at the abutment when the control lever is disengaged from the throttle lever. The second arm of the two-arm lever interlocks with the control lever in the operative position.

The working tool further comprises a return spring for biasing the throttle lever toward the idle position and for biasing the two-arm lever into engagement with the control lever.

Advantageously, the return spring is a rotational spring having a spring leg biasing the first arm of the two-arm lever toward the abutment. The distance between the axis of rotation of the throttle lever and a point of attack of the spring leg on the first arm of the two-arm lever is greater than the distance between the axis of rotation of throttle lever and a point of contact of the first arm of the two-arm lever at the abutment.

Preferably, the throttle lever has one arm resting in the idle position at the abutment.

Preferably, the catch member is a spring pawl that is an integral part of the throttle lever. The spring pawl has a free end engaging the control lever when the throttle lever is in the operative position and the control lever is coupled to the throttle lever.

The throttle lever and the control lever have a common axis of rotation.

Advantageously, the play compensation spring is a rotational spring having an axis of rotation coinciding with the axis of rotation of the control lever.

Preferably, the working tool further comprises a throttle lever spring connected to the second end of the cable for tensioning the cable. The spring constant of the throttle lever spring is greater than the spring constant of the play compensation spring.

Preferably, the grip comprises a guide slot in which the select switch is guided.

Preferably, the inner tube is a plastic tube comprised of electrically insulating plastic material.

Advantageously, the sleeve is a wire spiral and has an inner side with a coating of electrically insulating material.

Preferably, the cable is comprised of a wire having an outer coating of electrically insulating material.

In preferred embodiment of the present invention, the throttle lever is connected to the cable for transmitting adjusting movements of the throttle lever onto the drive motor and the choke actuator is connected to the inner tube for transmitting adjusting movements of the choke actuator onto the drive motor.

The longitudinally displaceable inner tube between the outer sleeve and the cable of the Bowden cable arrangement is able to transmit control movements and control forces from the grip onto the drive motor. With only one Bowden cable arrangement the control movements of two operating elements at the grip of the working tool can be transmitted onto the drive motor so that at least one Bowden cable arrangement of the operating elements can be eliminated. Due to the reduced number of Bowden cable arrangement the risk of catching of the transmission means during cutting operations at obstacles and failure of one of transmitting means (Bowden cable arrangements) by ageing is thus considerably reduced.

Advantageously, the cable and the sleeve of the Bowden cable arrangement are in the form of electrical leads that are insulated relative to one another so that the Bowden cable arrangement can be used for transmitting an electrical impulse. For this purpose, the Bowden cable arrangement is expediently connected to the short-circuiting switch which is preferably arranged together the choke actuator as a common select switch. The select switch can be positioned in a short-circuiting position in which the ignition circuit of the drive motor is short-circuited via the cable and the sleeve. In this arrangement the Bowden cable arrangement has a three-fold function. In addition to the transmission of mechanical control movements of the throttle lever and the choke actuator, the motor can be turned off by short-circuiting the ignition circuit.

Expediently, the throttle lever movement is transmitted by the cable of the Bowden cable arrangement and the choke actuation transmitted by the select switch, combining the short-circuiting switch and the choke actuator, via inner tube of the Bowden cable arrangement onto the drive motor. For this purpose one end of the inner tube can be coupled to the select switch, whereby the control movement of the select switch into the choke position of the choke flap can be transmitted via the inner tube onto the choke flap. Between the select switch and the inner tube a transmission lever is expediently provided for this purpose. The transmission lever is pivotably supported at the grip and comprises two arms. The first arm is jointedly connected to the inner tube. A translatory movement of the inner tube can be mechanically transmitted in this manner without tension onto the rotational pivoting movement of the transmission lever. Expediently, the second arm of the transmission lever is displaceable by an integral follower which is an integral part of the select switch whereby the transmission lever can be interlocked at the follower in a position which determines the start position of the choke flap.

In a further embodiment of the working tool it is suggested that at the grip a play compensation spring is arranged which tensions the cable of the Bowden cable arrangement and which is preferably comprised of an electrically conducting material. One end of the play compensation spring is connected to the cable of the Bowden cable arrangement. The play compensation spring tensions the cable with a permanent pulling action so that a play-free actuation of the throttle lever is possible. Furthermore, at the grip a start position return spring, acting on the select switch, can be provided which is also comprised of an electrically conducting material. The start position return spring biases the select switch into its operating position. The start position return spring effects that the select switch can be returned without or with only little force by the operator from the start position into the operating position. The start position return spring is advantageously connected with one end to the sleeve of the Bowden cable arrangement and contacts with its other end the play compensation spring in the short-circuiting position. The short-circuiting within the ignition circuit of the drive motor is achieved by the components cable, play compensation spring, start position return spring, and sleeve.

According to an expedient embodiment it is suggested that the cable of the Bowden cable arrangement is fastened at the grip to a pivotably supported control lever whereby the control lever, in idle position of the throttle lever, is disengaged from the throttle lever and in the operative position of the throttle lever is coupled thereto. Due to this arrangement play compensation is provided which compensates the lengthening of the cable of the Bowden cable arrangement, for example, due to ageing of the material or due to a change of position of the Bowden cable arrangement when a new guiding arrangement is provided, without changing the idle position of the throttle lever. In the idle position of the throttle lever, the control lever is freely pivotable and is maintained in position only by the pulling force of the cable of the Bowden arrangement and the oppositely acting force of the play compensation spring. As soon as the throttle lever is actuated by the operator, the control lever is coupled to the throttle lever so that each movement of the throttle lever is directly transmitted onto the cable of the Bowden cable arrangement and further onto the throttle flap of the drive motor. The throttle lever has expediently a catch member which engages (interlocks) in the coupling position the control lever. For this purpose the control lever is provided with an arc-shaped catch means. Advantageously, the grip is provided with an abutment at which the catch member is supported in the disengaged position. The abutment also defines the idle position of the throttle lever. In the disengaged position, one arm of the catch member, which is in the form of a two-arm lever, is supported at the abutment. The second arm of the pivotable two-arm lever interlocks in the coupled position with the control lever so that the movement of the throttle lever is transmitted via the catch member and the control lever onto the cable of the Bowden cable arrangement.

Moreover, a return spring is provided which biases the throttle lever in direction of the idle position and which biases the catch member in the direction of coupling with the control lever. This return spring can be in the form of a rotational spring having a spring leg acting on the first arm of the two-arm lever in the direction toward the abutment. The first arm of the two-arm lever is biased at one side by the return spring and is supported in the disengaged position at the abutment. The leverage ratio is selected such that, without action by the operator, the throttle lever is returned into its idle position and the two-arm lever is returned into its disengaged position.

BRIEF DESCRIPTION OF THE DRAWINGS

The object and advantageous of the present invention will appear more clearly from the following specification in conjunction with the accompanying drawings, in which:

FIGS. 2a and 2b show the grip of FIG. 1 in various views;

FIG. 5d shows the ignition system connected to the Bowden cable arrangement;

FIGS. 6a to 6d show different views of the throttle cable compensation at the grip;

FIG. 8 shows the throttle cable compensation in another embodiment.

DESCRIPTION OF PREFERRED EMBODIMENTS

The present invention will now be described in detail with the aid of several specific embodiments utilizing FIGS. 1 through 8.

Figure 1:
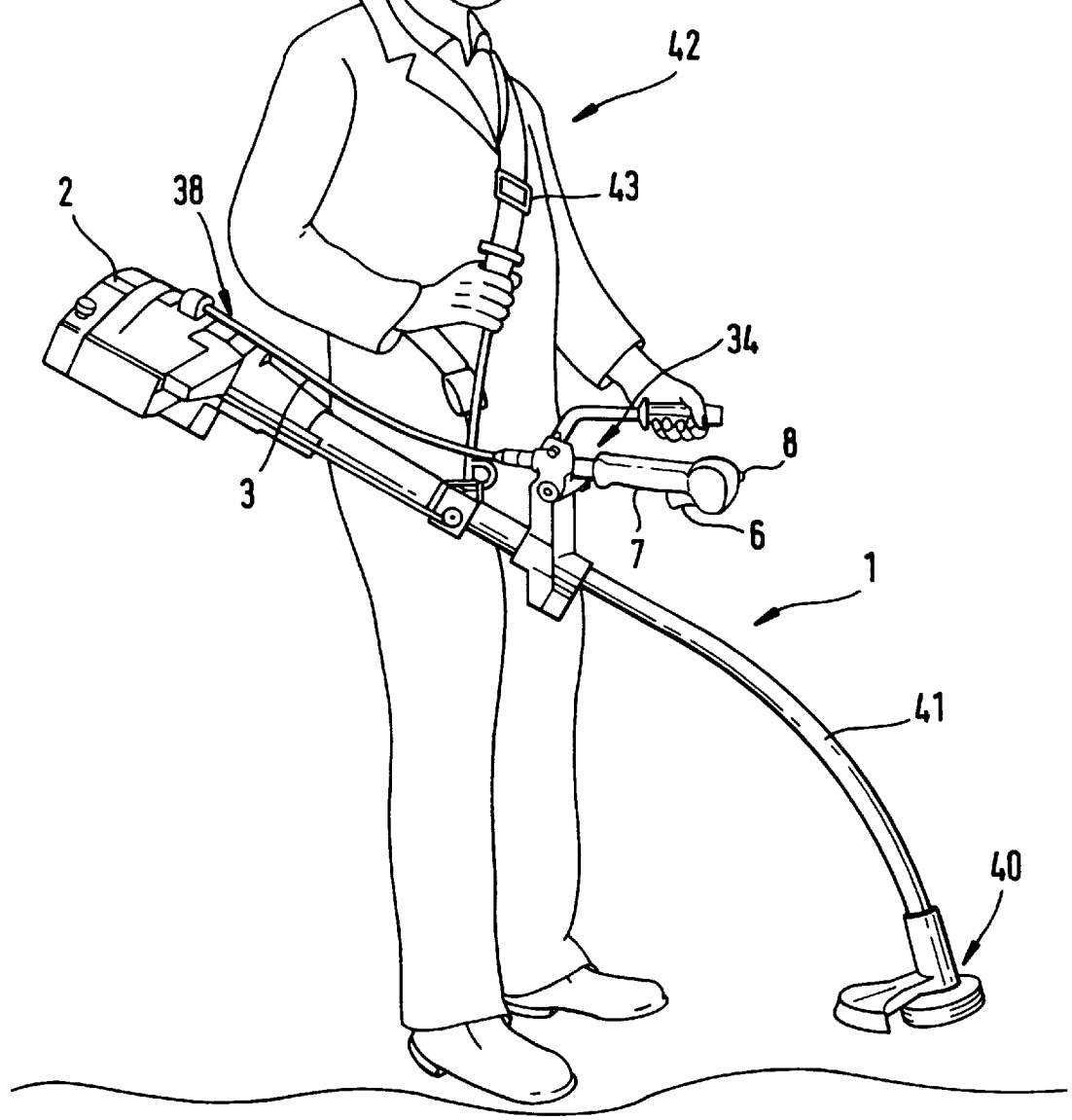
FIG. 1 shows a perspective representation of a hand-held working tool in operating position.

The hand-held working tool 1 represented in FIG. 1 is a trimmer having a cutter head 40 with cutting tool positioned therein which is driven by the drive shaft of drive motor 2 guided in the guide tube 41. The working tool 1 is operated by an operator 42 which receives the greatest portion of the weight of the working tool via the support belt 43. The working tool is to be guided with the grip arrangement 34 which is connected to the guide tube 41 and comprises a grip 7. The grip 7 has connected thereto operating elements controlling the drive motor 2 which is an internal combustion engine. The operating elements include a throttle lever, a choke actuator, a short-circuiting switch as well as a switch for arresting the choke flap in its start position. With the aid of the operating elements connected to the grip 7 the operator 42 can control all important functions of the internal combustion engine from the grip without having to remove one hand from an optimal and safe working position. The operational safety of the working tool is thus increased.

Between the operating elements at the grip 7 and the drive motor 2, a transmission device 38 for transmitting the control functions onto the drive motor is arranged which is embodied as a Bowden cable arrangement 3. In order to embody the handheld working tool such that the number of separate transmission devices between the grip and the drive motor is reduced it is suggested that as a further transmitting means an inner tube is arranged within the Bowden cable arrangement that is longitudinally displaceable between the sleeve and the cable of the Bowden cable arrangement. The inner tube transmits longitudinal forces and control movements, which the operator carries out at one of the operating elements at the grip, onto a corresponding component within the drive motor. Since the inner tube is guided within the sleeve of the already present Bowden cable arrangement, it is possible to transmit without an additional (separate) line or cable a further control movement onto the drive motor. The number of transmission devices is thus reduced so that the operational safety is increased and the material and service/maintenance expenditures are lowered.

FIG. 2a shows a section of the grip 7 with all operating elements arranged thereat. The grip 7, which is slipped onto a grip tube 35, has arranged thereat a throttle lever 6 as well as a select switch 8 via which different operational states of the combustion engine can be adjusted. The only transmission device 38 is the Bowden cable arrangement arranged between the grip 7 and the internal combustion engine. This Bowden cable arrangement is comprised of a sleeve 5 and a cable 4. The sleeve 5 is supported by a holder 44 at the grip 7 so that longitudinal forces acting on the cable 4 can be received as reaction forces by the grip 7 via the support 44 and the sleeve 5. The throttle lever 6 is connected with a lever arrangement to the cable 4. Any throttle lever movement is transmitted via the cable 4 onto the throttle flap 39 of the combustion engine represented in FIG. 8. Furthermore, an inner tube 9 is inventively provided which is arranged between the sleeve 5 and the cable 4 and which, in the longitudinal direction of the Bowden cable arrangement, is displaceable relative to the cable 4 as well as to the sleeve 5. According to FIGS. 2a and 2b the first end 9a of the inner tube 9 in the grip 7 is comprised of a transmitting element 36 and is coupled via a transmission lever 11 to the select switch 8. The adjusting movement of the select switch 8 in the choke position is transmitted via the transmission lever 11, the transmitting element 36, and the inner tube 9 onto the choke flap 10 of the internal combustion engine. The inner tube 9 is manufactured of a material that can transmit longitudinal forces, for example, is comprised of a flexible plastic material.

FIGS. 4a to 4e in views corresponding to the views of FIGS. 2a and 2b. For facilitating the representation only those components are represented that are important for the adjustment of the choke flap. FIGS. 4a to 4d show the select switch 8 in respective operational positions 13a to 13d in the following sequence: off position 13a, operating position 13b, start position 13c, and choke position 13d. The select switch 8 is displaceable within a guide slot 14 at the grip 7. The guide slot is in the form of a groove-shaped cutout at the grip 7. At the select switch 8 a guide pin 45 is provided which engages the guide slot 14 and is guided therein. Depending on the position of the guide pin 45 and of the select switch 8 along the path of the guide slot 14, the select switch 8 is in one of its operational positions 13a to 13d.

The end 9a of the inner tube which is comprised of the transmitting element 36 can be coupled via the transmission lever 11 to the select switch 8. The pivotably connected transmission lever 11 has two arms 11a, 11b which are arranged at an angle of approximately 90° to one another. The first arm 11a, which has approximately twice the length of the second arm 11b, is pivotably connected to the transmission element 36 so that the pivot movement of the transmission lever 11 is mechanically transmitted without tension into a translatory movement of the transmission element 36 and of the inner tube 9. The short second arm 11b of the transmission lever 11 rests at an integral follower 12 provided at the select switch 8 and can be displaced by the follower 12 into the choke position 13d for the choke flap (see FIGS. 4d, 4e). The integral follower 12 has a guide surface 46 at its side facing the transmission lever 11. The second arm 11b of the transmission lever 11 in the operational positions 13a to 13c (off position, operating position, and start position) can be guided at the guide surface 46 without displacing the integral follower 12. Adjacent to the guide surface 46 of the integral follower 12, a catch cutout 47 is provided which is shaped approximately identically to the free end of the second arm 11b of the transmission lever 11. In the position of the select switch 8 represented in FIG. 4c, the arm 11b rests at a wall of the catch cutout 47.

Figure 4D:
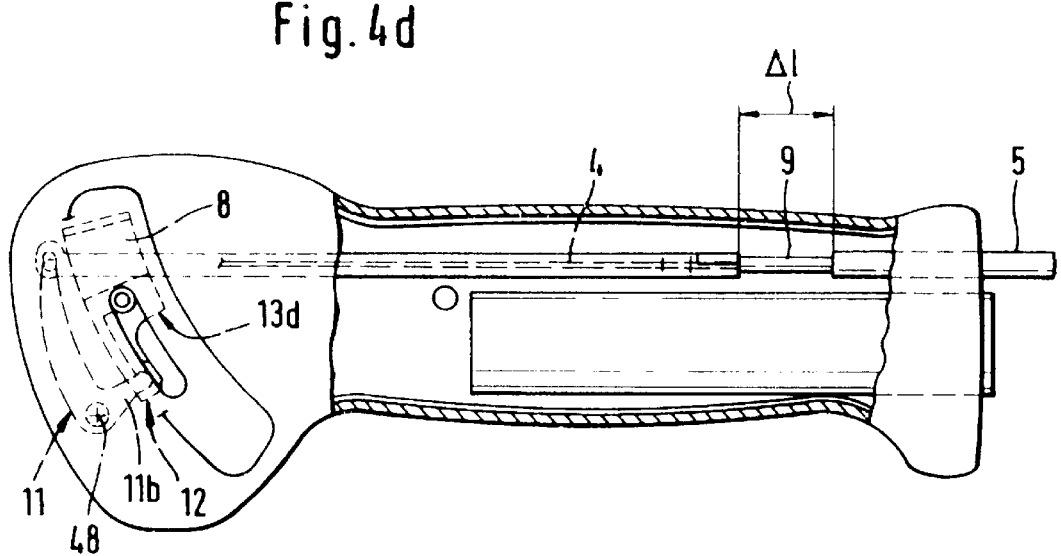
FIGS. 4a to 4e show different views of the choke adjustment at the grip.

When the select switch 8 is moved into the choke position 13d represent in FIG. 4d, the free end of the arm 11b is moved into the catch cutout 47 of the integral follower 12 and is interlocked therein.

The arm 11b in this locked position is located between the integral follower 12 and a grip shell of the grip 7. The transmission lever 11 rotates about its axis of rotation 48 so that the transmission element 36 and the inner tube 9 are pulled out of the sleeve 5 by an amount Δ1". With this control movement the choke flap 10 is moved into its cold start position. Expediently, the force which is required for releasing the transmission lever 11 from its locked position at the integral follower 12 is greater than the pulling force of a choke flap spring 52 (FIG. 2a) acting on the inner tube 9 and biasing the choke flap into its disengaged positions. Due to this arrangement the choke flap 10 can be moved into its disengaged position only by the operator activating the select switch. The transmission lever 11 can thus be moved in both switching directions of the select switch 8.

Figure 4E:
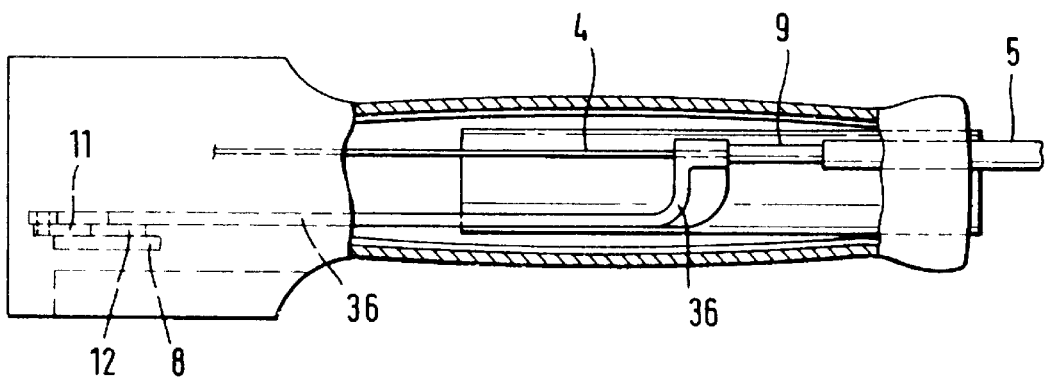
Figure 3:
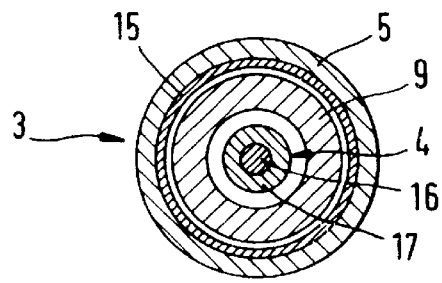
FIG. 3 shows a section of the Bowden cable arrangement.
Figure 4A:
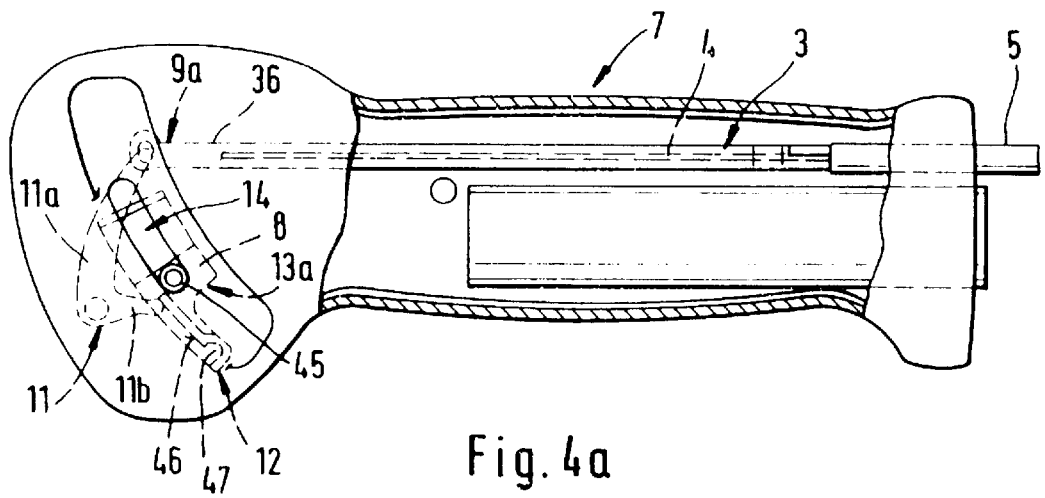
Figure 4B:
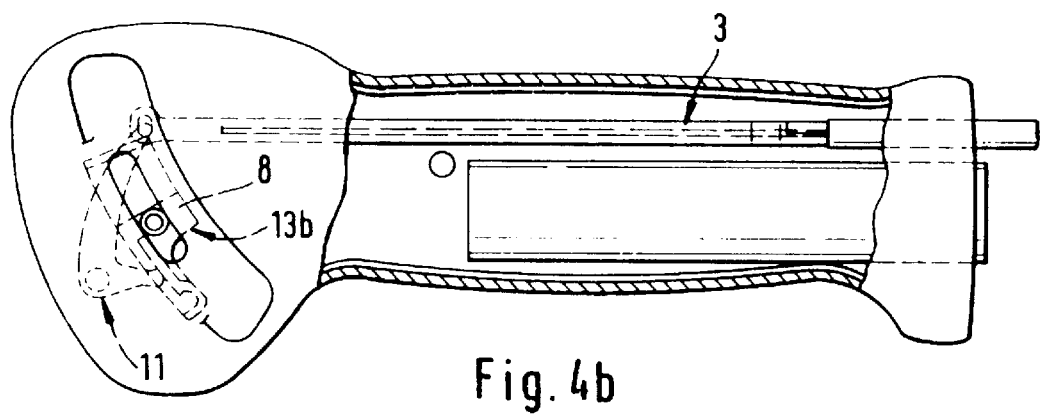
Figure 4C:
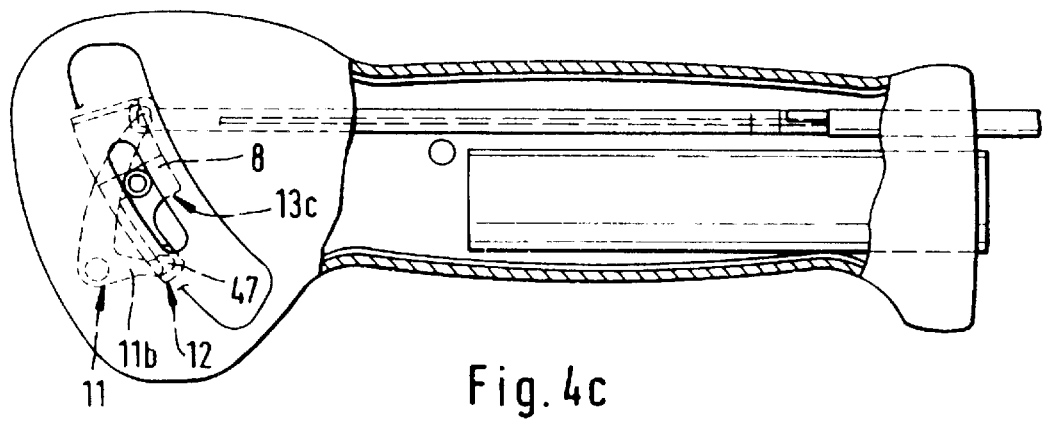

FIG. 4e shows that the transmission element 36, which is fixedly connected to the inner tube 9, extends substantially parallel to the cable 4. The cable 4 as well as the transmission element 36 can thus be coupled with further components at the grip 7 without impeding their respective functions.

In FIGS. 5a to 5d a further function of the Bowden cable arrangement is illustrated. The cable 4 and the sleeve 5 are advantageously embodied as electric leads which are insulated relative to one another. The cable 4 and the sleeve 5 can be employed for short-circuiting the electrical ignition circuit of the drive motor. When within the ignition circuit a short circuit is produced, no energy can flow from the magnet coil of the ignition device in order to produce an ignition spark. The motor is thus shut off.

Figure 5A:
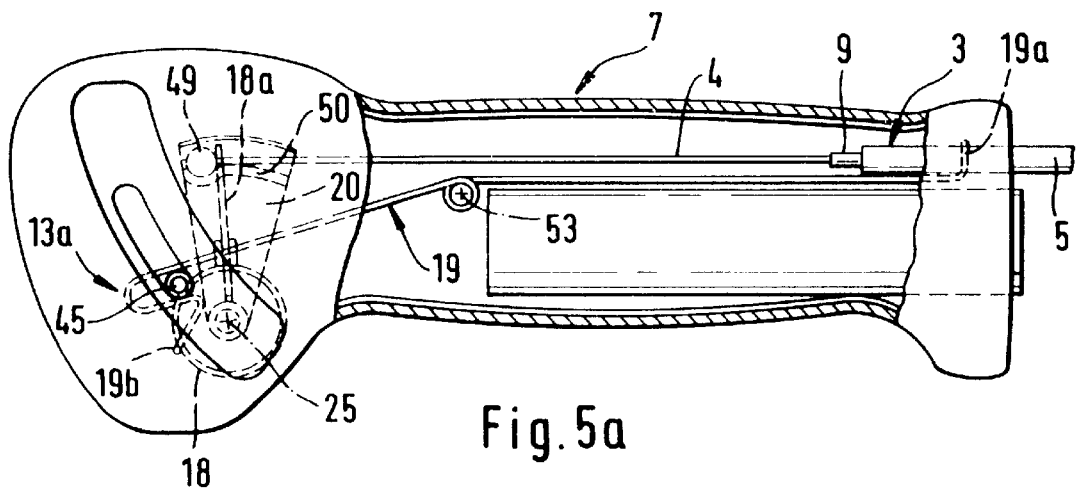
FIGS. 5a to 5c show different views of the select switch at the grip in short-circuiting position.
Figure 5B:
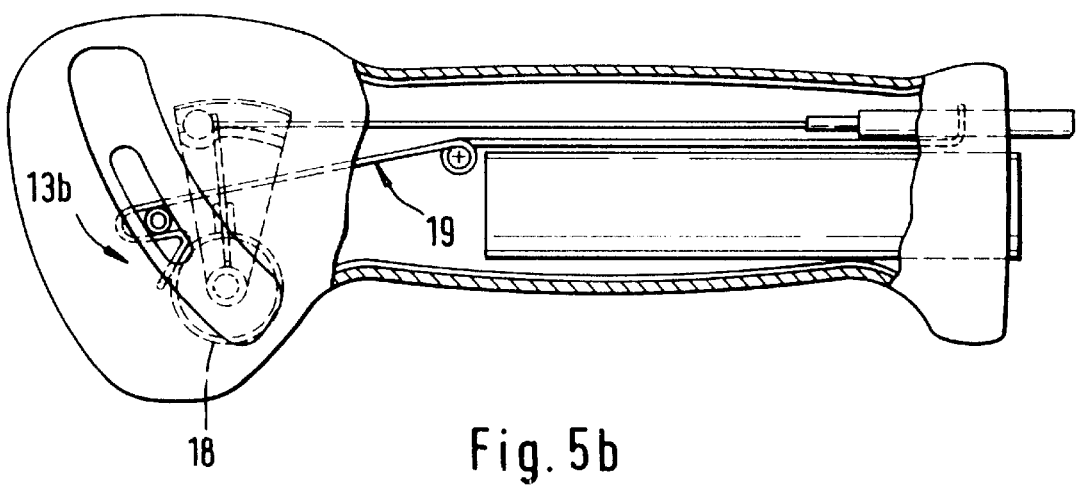
Figure 5C:
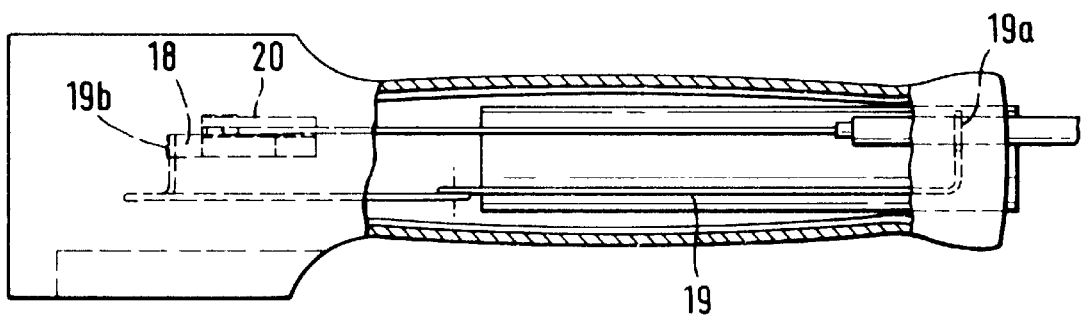

The short-circuiting position or off position 13a represented in FIG. 5a is advantageously selectable by the select switch 8. In the short-circuiting (off) position the cable 4 and sleeve 5 are connected in an electrically conducting manner. In order to prevent in the operating position 13b (FIG. 5b) as well as in the other positions 13c and 13d of the select switch 8 electrical contact between the sleeve 5 and the cable 4, the inner tube 9 interposed therebetween is expediently embodied as an insulator. In a special embodiment the inner tube 9 is comprised of an electrically non-conducting plastic material. According to FIG. 3, it may be expedient to apply to the inner side of the sleeve 5 in the form of a wire spiral an insulating coating 15. In this embodiment the electrical conductivity of the inner tube 9 is not important. In a further embodiment the Bowden cable 4 is in the form of a coated wire 16 the coating 17 of which is comprised of an electrically insulating material.

At the grip 7 a play compensation spring 18 comprised of electrically conducting material is arranged for tensioning the cable 4. In the short-circuiting position 13a (FIG. 5a) the spring 18 is in contact with a start position return spring 19 which is also comprised of an electrically conducting material. The start position return spring 19 is connected by its first end 19a to the sleeve 5, while the second end 19b contacts in the short-circuiting position (off position) 13a the play compensation spring 18. The short-circuit is produced via the cable 4, the play compensation spring 18, the start position return spring 19, and the sleeve 5.

FIG. 5d shows in a schematic representation the ignition system for an internal combustion engine which can be short-circuited via the Bowden cable arrangement. The ignition system is comprised of a charge coil 54 in which in a manner known per se via an ignition and transformer unit an ignition voltage is induced. The voltage is discharged at the ignition point within the spark plug 56 in order to produce an ignition spark.

The ignition coil 54 as well as the ignition and transformer unit 55 and the schematically represented carburetor 58 are grounded with cable 4 acting thereon via electrical line 59. At the potential side of the ignition and transformer unit 55 a switch-off line 57 is arranged which is connected with the sleeve 5 of the Bowden arrangement 3. The engine is switched off by short-circuiting the ignition and transformer unit 55 by switching the select switch into the off position, as disclosed above, and by connecting the cable 4 and the sleeve 5 in an electrically conducting manner via the play-compensation spring 18 and the start position return spring 19. The voltage which is generated within the ignition and transformer unit 55 is thus short-circuited so that in the ignition coil 54 no ignition voltage can be induced. In this embodiment it is advantageous that between the carburetor and the drive motor no voltage potential can be produced.

The start position return spring 19 is in the form of a two-leg rotational spring that is rotatable about spring axis 53 positioned approximately at the center of the grip 7. One end 19b of the return spring 19 surrounds the guide pin 45 of the select switch 8. The return spring 19 is tensioned such that the select switch 8 is always biased in the direction toward the operating position 13b. The return spring 19 ensures that the select switch 8, without any force application by the operator or with only a minimal force, can be moved from the off position 13a as well as the start position 13c and the choke position 13d into the desired operating position 13b. In the operating position 13b no force is acting on the select switch 8, i.e., the forces acting thereon are in equilibrium.

The play compensation spring 18 is advantageously embodied as a rotational spring having a spring leg 18a which acts on the free end of the cable 4 so that the cable 4 is tensioned. Advantageously, the cable 4 has connected to its end at the grip 7 a catch ball 49 which is supported within the control lever 20. The control lever 20 is pivotable about its axis of rotation 25 which is advantageously also the spring axis of the play compensation spring 18. A lock shoulder 50 is provided at the control lever 20. It has a semi-circular cutout which is engaged by the catch ball 49 of the cable 4. The catch ball 49 is secured within the cutout by the force of the play compensation spring 18.

The control lever 20 is connected to the throttle lever 6 in order to be able to transmit movements of the throttle lever 6 onto the throttle flap of the combustion engine. In order to ensure a play-free actuation of the throttle lever 6, play compensation is provided with which possible lengthening of the cable 4 can be compensated (see FIGS. 6a–6c). In the idle position 21 of the throttle lever 6 (FIG. 6a) the control lever 20 is advantageously disengaged (position 23) from the throttle lever 6. As soon as the throttle lever 6 is actuated and moved into the operative position 22 (FIG. 6b), the throttle lever 6 and the control lever 20 are coupled to one another. For transmitting the throttle lever movement onto the control lever 20 and also onto the cable 4, the end face 26 of the control lever 20 facing away from the axis of rotation 25 is arc-shaped and comprises a catch means 27. The throttle lever 6 is provided with a catch member 28 which in the coupling position 24 engages the catch means 27 of the control lever 20. The catch means 27 of the control lever 20 is expediently in the form of locking teeth which engage identically embodied teeth at the catch member 28.

Figure 6A:
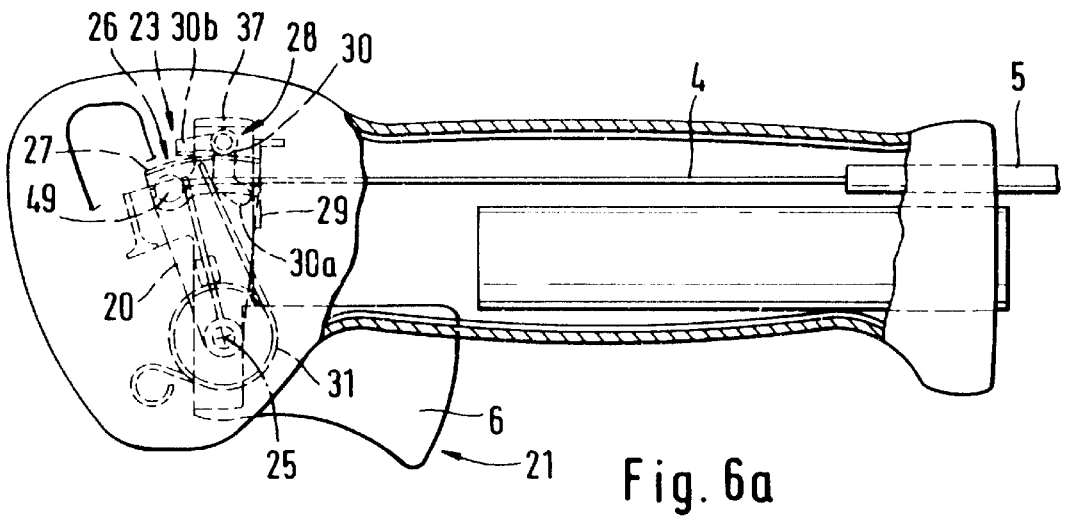
Figure 6B:
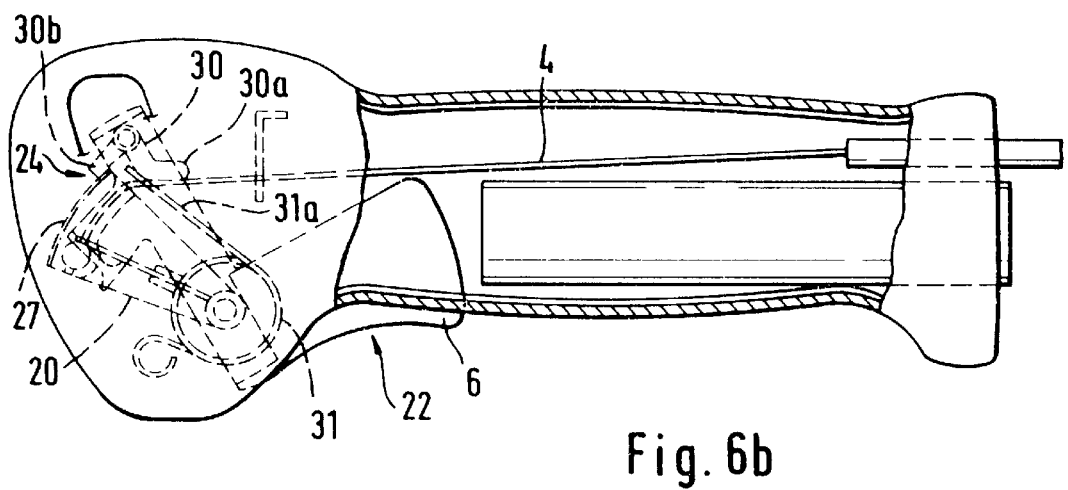
Figure 6C:
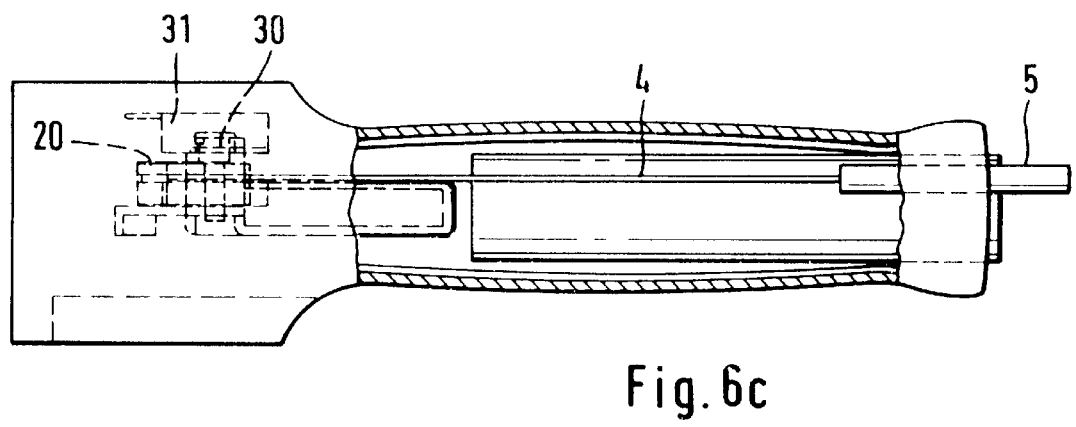
Figure 7A:
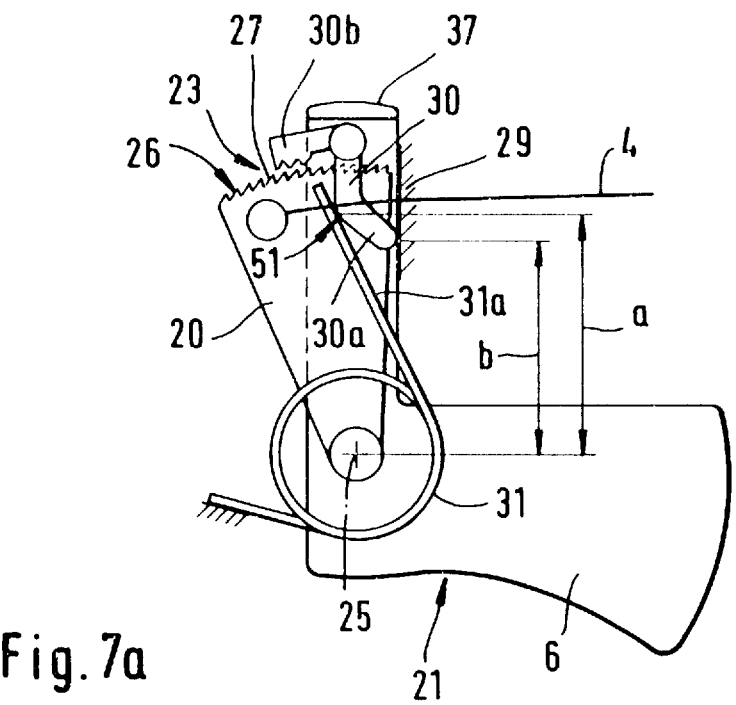
FIGS. 7a, 7b show details of FIGS. 6a, 6b in an enlarged representation.
Figure 7B:
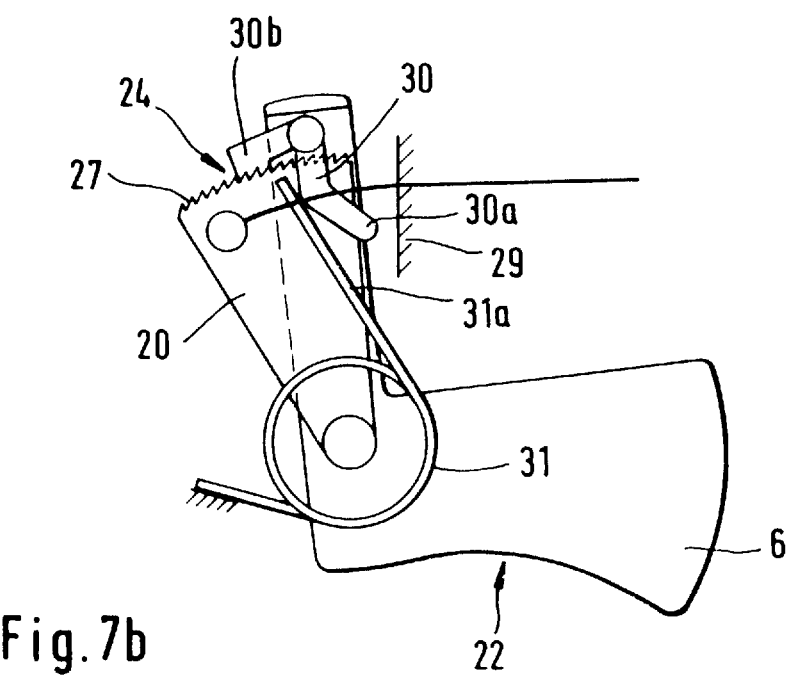

FIGS. 7a and 7b show in detail representations according to FIGS. 6a and 6b. The catch member 28 is preferably embodied as a two-arm lever 30 pivotably supported at the throttle lever 6. In the disengaged position 23 (FIG. 7a) it rests with its first arm 30a at the abutment 29. The second arm 30b of the two-arm lever 30 interlocks in the coupling position 24 (FIG. 7b) with the locking teeth (27) at the control lever 20. In the idle position 21 of the throttle lever 6, the throttle lever 6 and the control lever 20 are thus always positioned in the disengaged position. The control lever 20 is biased by the play compensation spring 18 into a position in which the control lever 20 is in equilibrium. Possible lengthening of the cable 4 is compensated by a slight pivoting of the control lever 20 that does not affect the throttle lever 6. The idle position 21 of the throttle lever 6 thus remains unchanged even though the cable 4 may lengthen.

The throttle lever 6 is biased by a return spring 31 in the direction of the idle position 21. Due to the action of the return spring 31 the throttle lever 6, without any action of the operator, is thus always positioned in its idle position. Expediently, the return spring 31 is a rotational spring having a spring axis which coincides with the axis of rotation 25 of the throttle lever 6, respectively, of the control lever 20. One spring leg 31a of the return spring 31 presses against the two-arm lever 30 and biases it in the direction of its coupling position 24 with the control lever 20 (FIG. 7b). Via the two-arm lever 30, which is arranged at one arm 37 of the throttle lever 6, the throttle lever 6 is thus biased by the return spring 31 in the direction of idle position 21. At the same time, the two-arm lever 30 is biased in the direction of the coupling position 24 because the spring leg 31a acts on one arm 30a of the two-arm lever 30 so that the second arm 30b of the two-arm lever is in coupling position with the locking teeth 27 of the control lever 20.

In order to move the two-arm lever 30 upon actuation of the throttle lever 6 into its coupling position 24, it is suggested that the arm 30 of the two-arm lever 30, onto which the throttle lever return spring 31 acts, is provided with a knee 51 facing the spring leg 31a. The spring leg 31a rests at the knee 51 of the arm 30a. The free end of the arm 30a is supported in the disengaged position 23 at the abutment 29. The distance a between the axis of rotation 25 of the throttle lever 6 and the point of attack at the knee 51 is preferably greater than the distance b between the axis of rotation 25 and the free end of the arm 30a which rests at the abutment 29. Due to this leverage ratio it is ensured that upon return of the throttle lever 6 into its idle position 21 after the first contact of the arm 30a at the abutment 29, the two-arm lever 30 is pivoted by the force of the return spring 31 into the disengaged position 23. In order to further assist this action, the arm 37 of the throttle lever 6 at which the two-arm lever 30 is supported can be supported also at the abutment 29 in the idle position 21. Thus, with only one return spring 31 the throttle lever 6 is biased in the direction of idle position and, at the same time, an effective mechanism for play compensation is realized.

FIG. 8 shows a further embodiment for a gas cable compensation. The catch member 28 is a pawl-shaped spring 32 which is an integral component of the arm 37 of the throttle lever 6. The spring 32 is arranged at the free end of the arm 37 and is positioned radially outwardly of the arc with locking teeth 27 at the control lever 20. The pawl-shaped spring 32 is connected with one end to the arm 37. In the disengaged position 23 the other end 32a rests at a distance to the locking teeth 27 of the control lever 20 whereby the abutment 29 acts on the spring 32 and secures it in the disengaged position. The throttle lever 6 is biased by the torque of the return spring 31 in the direction of its idle position whereby the force of the pawl-shaped spring 32 is expediently smaller than the return force which corresponds to the torque of the return spring 31 acting on the throttle lever 6. The pawl-shaped spring 32 is thus automatically returned into the disengaged position 23 as soon the throttle lever 6 is returned into its idle position. In this position the pawl-shaped spring 32 is supported at the abutment 29 and is maintained by it at a radial distance to the locking teeth 27.

The cable 4 is expediently tensioned at the side of the drive motor by a throttle flap spring 33 having a spring constant which is greater than the spring constant of the play compensation spring 18 acting on the other end of the cable 4. The throttle flap, under the action of the throttle flap spring 33, without any action by the operator onto the throttle lever 6, is maintained in its idle position. On the other hand, the play compensation spring 18 permanently tensions the cable 4 and pivots upon lengthening of the cable 4 the control lever 20 into the equilibrium position independent of the idle position and full throttle position of the throttle lever 6.

It may be expedient to arrest the select switch 8 in each of its operational positions 13a to 13d in order to ensure that the select switch 8 can not be moved accidently into an undesired operational position. For this purpose, the guided slot 14 can be provided with cutouts to be interlockingly engaged by the guide pin 45 of the select switch 8.

The multiple functions of the Bowden cable arrangement can be used not only for hand-held trimmers but also for other hand-held working tools such as plant sprayers, blowers, or similar devices. It is also possible to control with the inventive device the functions of an electrical drive motor instead of the internal combustion engine disclosed in connection the invention.

The present invention is, of course, in no way restricted to the specific disclosure of the specification and drawings, but also encompasses any modifications within the scope of the appended claims.

What we claim is:

1. A hand-held working tool comprising:

a drive motor;

a grip connected at a distance to said drive motor;

operating elements, including a throttle lever, a choke actuator, and a short-circuiting switch, connected to said grip for controlling said drive motor;

a transmission device, comprising a Bowden cable arrangement with a sleeve and a cable enclosed by said sleeve, for connecting said operating elements to said drive motor;

said transmission device comprising an inner tube inserted into said Bowden cable arrangement, wherein said inner tube is positioned between said sleeve and said cable and is longitudinally displaceable relative to said sleeve and said cable.

2. A working tool according to claim 1, wherein said cable and said sleeve are electrical leads that are insulated relative to one another.

3. A working tool according to claim 2, wherein said choke actuator and said short-circuiting switch are combined in a select switch having a plurality of operational positions, wherein said operational positions include a short-circuiting position in which an ignition circuit of said drive motor is short-circuited by said sleeve and said cable.

4. A working tool according to claim 3, wherein:

said inner tube has a first end that is coupled to said select switch;

said select switch comprises an integral follower;

said transmission device comprises a pivotable transmission lever with a first arm and a second arm;

said first arm is pivotably connected to said first end of said inner tube;

said integral follower acting on said second arm for displacing said second arm;

said operational positions include a choke position; and said transmission lever is locked at said integral follower in said choke position of said select switch.

5. A working tool according to claim 3, further comprising a play compensation spring connected to said grip, said play compensation spring comprised of an electrically conducting material, wherein said play compensation spring has a first end connected to said cable for tensioning said cable.

6. A working tool according to claim 5, wherein said operational positions of said select switch include a start position for starting said drive motor and an operating position for operating said working tool, said working tool further comprising a start position return spring comprised of an electrically conducting material and biasing said select switch into said operating position, said start position return spring having a first end and a second end, wherein said first end is connected to said sleeve and wherein said second end contacts said play compensation spring in said short-circuiting position of said select switch.

7. A working tool according to claim 6, further comprising a control lever pivotably connected to said grip, wherein:

said cable has a first end and a second end, said first end connected to said control lever;

said throttle lever has an operative position and an idle position;

said control lever in said operative position of said throttle lever is coupled to said throttle lever and in said idle position is disengaged from said throttle lever;

said control lever has an arc-shaped portion with a catch means;

said throttle lever has a catch member;

said catch member engages said catch means in said operative position for coupling said throttle lever to said control lever; and said grip has an abutment at which said catch member rests when said control lever is disengaged from said throttle lever.

8. A working tool according to claim 7, wherein said catch member is a two-arm lever pivotably connected to said throttle lever, wherein a first arm of said two-arm lever rests at said abutment when said control lever is disengaged from said throttle lever and wherein a second arm of said two-arm lever interlocks with said control lever in said operative position, said working tool further comprising a return spring for biasing said throttle lever toward said idle position and for biasing said two-arm lever into engagement with said control lever.

9. A working tool according to claim 8, wherein said return spring is a rotational spring having a spring leg biasing said first arm of said two-arm lever toward said abutment and wherein a distance between an axis of rotation of said throttle lever and a point of attack of said spring leg on said first arm of said two-arm lever is greater than a distance between said axis of rotation of said throttle lever and a point of contact of said first arm of said two-arm lever at said abutment.

10. A working tool according to claim 7, wherein said throttle lever has one arm resting in said idle position at said abutment.

11. A working tool according to claim 7, wherein said catch member is a spring pawl and is an integral part of said throttle lever, said spring pawl having a free end engaging said control lever when said throttle lever is in said operative position and said control lever is coupled to said throttle lever.

12. A working tool according to claim 7, wherein said throttle lever and said control lever have a common axis of rotation.

13. A working tool according to claim 12, wherein said play compensation spring is a rotational spring having an axis of rotation coinciding with said axis of rotation of said control lever.

14. A working tool according to claim 7, further comprising a throttle flap spring connected to said second end of said cable for tensioning said cable, wherein a spring constant of said throttle flap spring is greater than a spring constant of said play compensation spring.

15. A working tool according to claim 3, wherein said grip comprises a guide slot in which said select switch is guided.

16. A working tool according to claim 2, wherein said inner tube is a plastic tube comprised of electrically insulating plastic material.

17. A working tool according to claim 2, wherein said sleeve is a wire spiral and has an inner side with a coating of electrically insulating material.

18. A working tool according to claim 2, wherein said cable is comprised of a wire having an outer coating of electrically insulating material.

19. A working tool according to claim 1, wherein said throttle lever is connected to said cable for transmitting adjusting movements of said throttle lever onto said drive motor and wherein said choke actuator is connected to said inner tube for transmitting adjusting movements of said choke actuator onto said drive motor.

* * * * *